Figure 1:
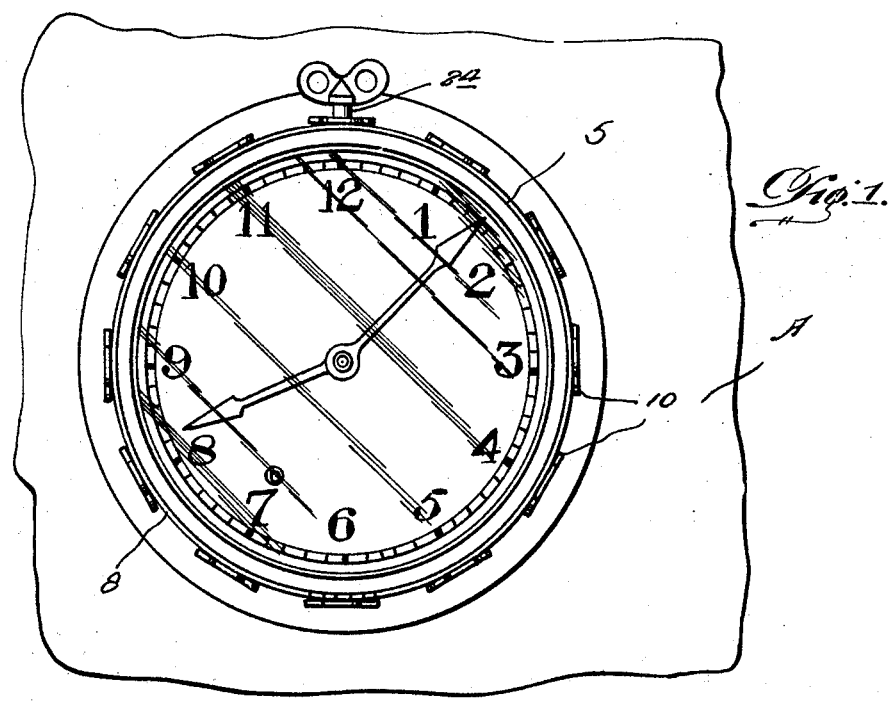

Jan. 27, 1925.

H. A. SHORT 1,524,216

IGNITION LOCK FOR MOTOR VEHICLES

Filed Dec. 6, 1923    2 Sheets-Sheet 1

H. A. Short,
Inventor

By Clarence O'Brien
Attorney

Jan. 27, 1925. 1,524,216
H. A. SHORT
IGNITION LOCK FOR MOTOR VEHICLES
Filed Dec. 6, 1923
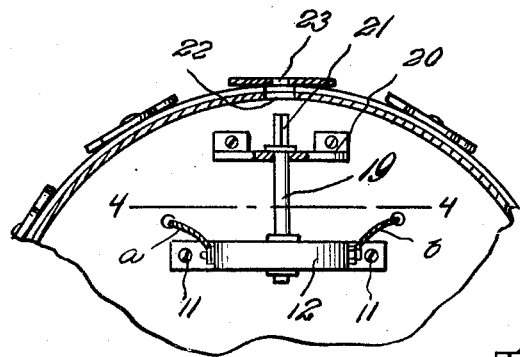
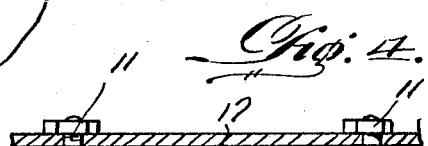
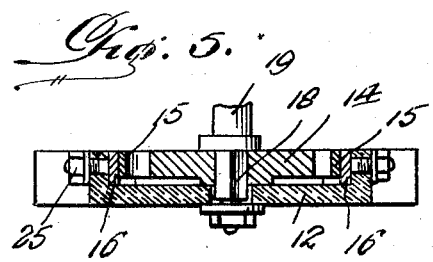
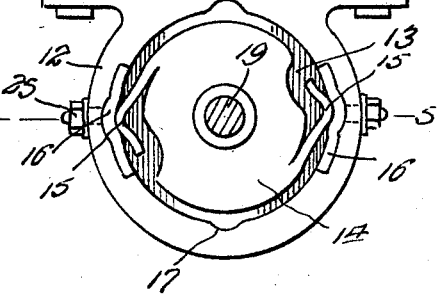
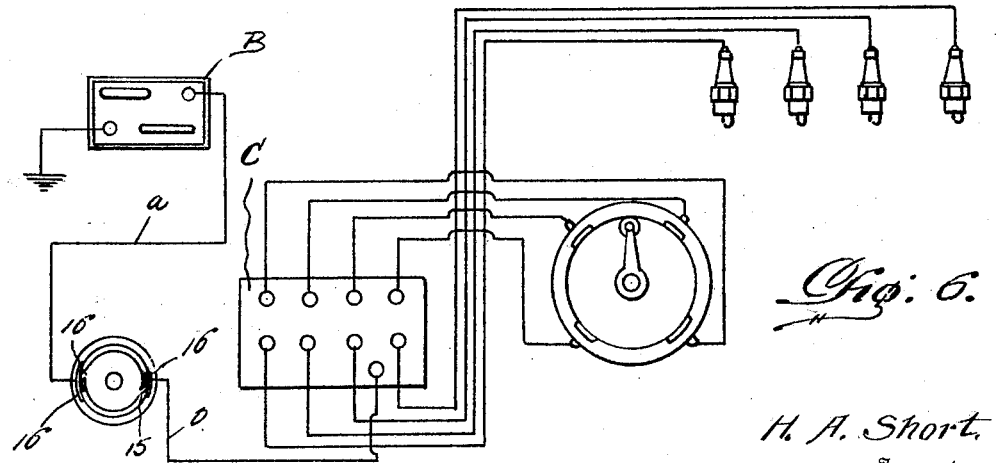
H. A. Short,
Inventor Patented Jan. 27, 1925.

1,524,216

UNITED STATES PATENT OFFICE.

HERMAN A. SHORT, OF DES MOINES, IOWA.

IGNITION LOCK FOR MOTOR VEHICLES.

Application filed December 6, 1923. Serial No. 678,990.

*To all whom it may concern:*

Be it known that I, HERMAN A. SHORT, a citizen of the United States, residing at Des Moines, in the county of Polk and State of Iowa, have invented certain new and useful Improvements in Ignition Locks for Motor Vehicles, of which the following is a specification.

This invention relates to an improvement in ignition locks for motor vehicles and has more particular reference to a device of this character whereby unauthorized persons will be prevented from starting the engine of the vehicle during the absence of the lawful owner.

The above result is obtained through the provision of a suitable switch interposed between the storage battery and the spark plug of the engine, and this in such a manner as to be inaccessible to anyone but the proper person, in other words, said switch is secretly disposed upon the instrument board of the vehicle in such a manner whereby access through the medium of a suitable key may be had thereto only by authorized persons.

The primary object of the present invention is to provide a device of the above character that is a substantial improvement over other devices and one whereby the same may be manufactured and installed at a minimum cost and wherein the same will operate effectively under all conditions.

With the above and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the different views.

Figure 2:
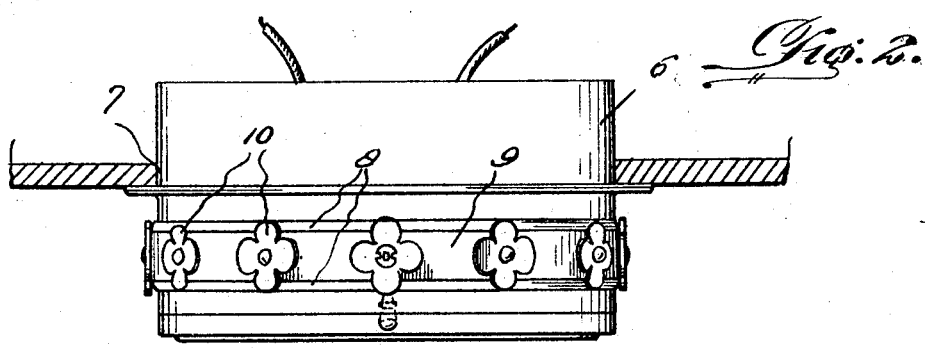
Figure 7:
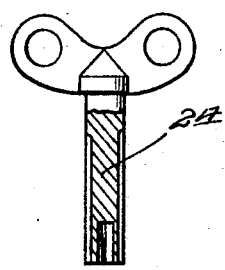

Figure 1 is a front elevational view of a vehicle instrument board clock that comprises an essential part of the present device, Figure 2 is a fragmentary longitudinal section through said instrument board for disclosing in top plan said clock, Figure 3 is a fragmentary sectional view through said clock for disclosing in side elevation, the switch member per se, Figure 4 is an enlarged detail transverse sectional view of said switch element taken substantially upon the line 4—4 of said Figure 3, Figure 5 is also a detailed cross sectional view taken through said switch element, and this substantially upon the line 5—5 of Figure 4, Figure 6 is a diagrammatic view of the wiring system of the present invention, and Figure 7 is a view partly in elevation and partly in cross section, of a key employed in conjunction with this invention.

Now having particular reference to the drawing, 5 designates generally a clock of circular shape, the casing 6 of which is relatively wide and that is adapted to be positioned within a circular opening 7 of the vehicle instrument board A. This clock 5 may be of the rim or key winding and setting type as desirable. Formed circumferentially around said casing 6 and specifically that portion of which is disposed outwardly of said instrument board A is a pair of spaced ribs 8 within which is freely rotatable a band of sheet metal 9 the same being formed or provided with spaced ornaments 10 preferably of the configuration of a four leaf clover, said ornaments also serving as a means for facilitating the easy manual rotation of said band around the clock casing.

The inner portion of the casing 6 that extends through the before mentioned opening in the instrument board A extends beyond the rear wall of the clock as more clearly shown in the fragmentary cross sectional view, Figure 3, and secured to said rear wall as at 11—11 is a horizontally disposed circular shaped fiber plate 12 that forms an essential part of the switch element per se of the present invention.

The top side of this plate 12 is formed with a circular shaped recess 13 within which is rotatably disposed a contact member 14. This contact member 14 is formed upon diametrically opposite sides with integral spring fingers 15 that engage within depressions formed ventrally upon stationary contracts 16—16 embedded within the fiber plate 12 at diametrically opposite sides of said depression 13 or within curved notches 17—17 intermediate said contact plates 16—16 for maintaining said rotatable contact element 14 in set position.

The rotary contact element 14 is detachably connected to the lower squared end 18 of a vertical post 19 the upper end of which is guided through an opening in a bracket 20 that is secured at its opposite end to the back of said clock 5 the extreme end of this stem 19 being squared as at 21 and being positioned directly beneath an opening 22 in the clock casing 6.

One of the clover shaped ornaments 10 carried by the band 9 is formed centrally with an opening 23 that registers with an opening in said band 9, it being apparent that when the band is so moved as to position the ornament 10 toward the opening 23 directly over the opening 22 in said clock casing the stem 19 may be conveniently rotated through the medium of a suitable form of key 24, Figure 7, for consequently moving the spring contacts 15—15 into or out of engagement with the stationary contacts 16—16.

The stationary contacts 16—16 are equipped with binding posts 25, and in actual use these binding posts are respectively electrically connected as at $a$ and $b$ to one of the posts of a storage battery B and the proper contact of the coil box C.

It will thus be seen that when the operator of the vehicle wishes to cut off the ignition to the engine the key 24 may be inserted through the registering opening in the clover shaped ornament 10, the band 9 and clock casing 6, after which the rotary contact 14 may be moved to bring the spring contacts 15—15 out of engagement with the stationary contacts 16—16, the positioning of these spring contacts 15—15 into the notches 17—17, precluding any accidental rotation of said contact member 14. After the contact member 14 has been so rotated the key is withdrawn and the band 9 rotated which will thereby prevent any unauthorized person unless he should be familiar with a device of this character from moving the switch into closed position.

Numerous advantages of a switch lock for motor vehicles of this character will be at once appreciated by those skilled in the art, and even though I have herein set forth the most practical embodiment of the invention with which I am at this time familiar, it is nevertheless to be understood that minor changes may be made in the invention without departing from the spirit and scope of the appended claim.

Having thus described by invention, what I claim as new and desire to secure by Letters Patent is:

An ignition lock comprising a cylindrical casing provided at its side with an opening and having upon its exterior spaced ribs located, one at each side of said opening, a band fitting between the ribs and rotatably mounted with respect to the casing and ribs, and having an opening adapted to be brought into register with the opening in the casing, a post rotatably mounted in the casing and aligned with the opening in the side of the casing, stationary contact elements located in the casing at the opposite sides of the post, and a disc mounted upon the post and having at its periphery outwardly bowed resilient fingers adapted to engage the contact members to establish an electric conducting means between the said contact members.

In testimony whereof I affix my signature.

HERMAN A. SHORT.